UNITED STATES PATENT OFFICE 2,276,204

CHEMICAL LIGHT FILTER

Lowell B. Kilgore, Washington, D. C., assignor to Kilgore Development Corporation, Washington, D. C., a corporation of Virginia No Drawing. Application January 2, 1940, Serial No. 312,149

17 Claims. (Cl. 88—114)

This invention relates to new compositions that I have discovered to be particularly effective as screens or filters for light.

There is an insistent demand for improved light screening compositions to be applied to human skin. However, requirements are severe. There should be no offensive odors, neither in the compounds used nor in any deterioration products thereof. Nor should there be any untoward physiological effects such as irritation of skin. Neither should the screening compounds impart any pronounced color in the medium in which they are applied since foreign color on the skin of a person is undesirable.

Also, the compounds should be distributable in media that are not sticky or gummy. Moreover, the screening compounds themselves should be so effective that even in low concentrations they do not require augmentation by the oils that are sometimes used as sun screens; oily vehicles are distasteful to many persons. The compounds should be distributable in a given vehicle to result in a thin film rather than discrete particles or powder. Also, the volatility of the sun screening compositions should be low so that the compositions do not evaporate readily. Furthermore, the compositions should be but slightly soluble in water so that when applied as a sun screen to persons who are bathing, for example, the film nevertheless will remain effective for an appreciable period of time.

Moreover, it is of utmost importance that the screening compounds absorb radiant energy of wave lengths that burn human skin and dissipate that radiant energy with high efficiency without forming undesirable chemical products. For example, some oils tend to absorb radiant energy but are themselves transformed into sticky films.

Light screens are applied to a variety of uses. Some screens are used as films or as sheets in coverings or coatings in the nature of lacquers or of wrappings for inanimate objects. For example, sheets of Cellophane may be filmed with light-screening material, or a lacquer containing such material may be applied to newspapers or documents as protection against deterioration by light.

An object of this invention is to provide compounds that are highly efficient in dissipating the skin burning rays of sun light that lie in the wave band of approximately 2900 to 4000 Angstrom units. Moreover, a purpose of this invention is to present chemical compounds that exhibit other desirable properties hereinbefore set forth. These and other objects will appear more fully in the following description of the principles of this invention and of illustrative embodiments thereof, as more fully pointed out in the appended claims.

Objects and benefits of this invention are attained particularly with certain organic chemicals, as I have discovered and determined by experiment, which belong to the class of substituted α-hydroxy-gamma-keto-α, δ-hexadienoic acid esters of the general formula:

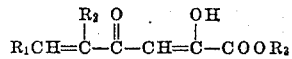

wherein $R_1$ may be an aromatic radical or a heterocyclic radical, $R_2$ may be an alkyl group preferably but not necessarily of the type $C_nH_{2n+1}$ or hydrogen, and $R_3$ may be any organic radical capable of forming an ester with the carboxyl group. A particularly effective application of this invention is obtained with compounds of this nature wherein $R_1$ is a phenyl group ($C_6H_5$), or a substituted phenyl group, and wherein $R_3$ is an alkyl group or an aralkyl group. A particularly valuable compound which at present in many of its qualities is preferred is described by this formula wherein $R_1$ is a phenyl group, $R_2$ is hydrogen and $R_3$ is a butyl group. However, the invention is not thus limited, inasmuch as these examples are intended to be illustrative.

When in the above-stated general formula $R_1$ is the phenyl group ($C_6H_5$), and $R_2$ is hydrogen and $R_3$ is the butyl group, $C_4H_9$, the compound is:

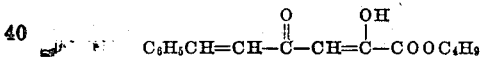

This compound is benzalacetone oxalate, butyl ester. The normal butyl ester is sufficiently illustrative and in respect to some of its properties is at present preferred in the practice of this invention.

It will be apparent from this formula that these compounds exist in the enol form.

In order to illustrate variations of $R_3$, the organic radical capable of forming an ester with the carboxyl group, there are presented the following compounds which have actually been tested and found useful as sun screens:

Benzalacetone oxalate, methyl ester yellow solid M. P. 72–73° C.
Benzalacetone oxalate, ethyl ester yellow solid M. P. 84–85° C.
Benzalacetone oxalate, isopropyl ester yellow solid M. P. 44–46° C.
Benzalacetone oxalate, butyl ester yellow solid M. P. 65–66° C.
Benzalacetone oxalate, isobutyl ester yellow solid M. P. 56.5–57.5° C.
Benzalacetone oxalate, amyl ester yellow solid M. P. 60–62° C.
Benzalacetone oxalate, cyclohexyl ester yellow solid M. P. 90–92° C.
Benzalacetone oxalate, benzyl ester yellow solid M. P. 98–99° C.
Benzalacetone oxalate, allyl ester yellow solid M. P. 83.5–85° C.
Benzalacetone oxalate, β-ethoxyethyl ester yellow solid M. P. 63.5–65.5° C.

It will be clear to those skilled in the art that introduction of various radicals in the $R_3$ position is not limited either to these particular radicals nor to these particular substituents in the $R_1$ and $R_2$ positions.

Sufficiently illustrative of the variability of $R_1$ as a phenyl or as a substituted phenyl group, in addition to the benzalacetone oxalate above-listed are the following compounds comprising substituted phenyl group in the $R_1$ position. These also are excellent as sun screen or so-called ultra-violet light filters.

2-hydroxybenzalacetone oxalate, butyl ester orange yellow solid M. P. 123–125° C.

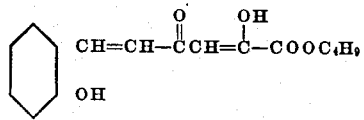

2-chlorobenzalacetone oxalate, butyl ester yellow solid M. P. 66–67° C.

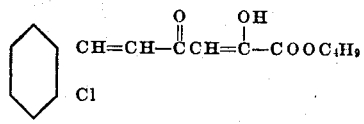

4-methylbenzalacetone oxalate, butyl ester yellow solid, M. P. 65–67° C.

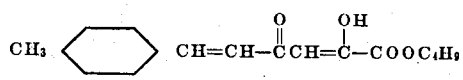

4-methoxybenzalacetone oxalate, butyl ester orange yellow solid M. P. 73–75° C.

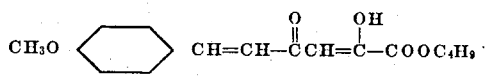

When $R_1$ is an aromatic substituted alkyl radical and $R_2$ is hydrogen, a resulting compound is cinnamalacetone oxalate, n-butyl ester: orange yellow solid M. P. 93–94°.

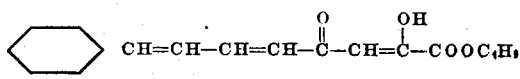

When $R_1$ is a heterocyclic radical and $R_2$ is hydrogen, a resulting compound is:

Furfuralacetone oxalate, ethyl ester orange brown solid, M. P. 78–80°.

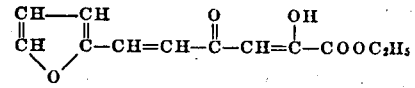

Furfuralacetone oxalate, butyl ester orange brown solid M. P. 63–64°.

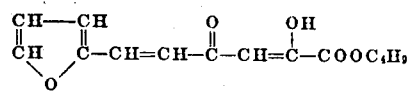

When $R_1$ is an aromatic radical and $R_2$ is an alkyl radical, a resulting compound is:

δ-benzal-δ-methylacetone oxalate, butyl ester light yellow solid M. P. 64–65°.

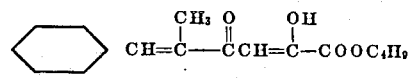

It will be understood that other than these specific esters are suitable, though the butyl and the amyl esters are particularly advantageous and are at present preferred.

It is desirable to use the above-described organic compounds with a non-volatile binder so as to produce a film on the skin which retains the screen as a film. For example, I may dissolve the screening compound in diethyl phthalate and dilute it with alcohol and water to give the proper concentration, as in this formula:

Benzalacetone oxalate, butyl ester_gms__ 0.25
Diethyl phthalate _____cc__ 15
Alcohol _____cc__ 70
Water _____cc__ 100

This results in such distribution of the sun screen organic compound as to form a continuous film when the volatile diluents have evaporated. Thus, when this liquid mixture is applied to the skin, the alcohol and water evaporate leaving a substantially dry film of the screening compound, benzalacetone oxalate, butyl ester, held in a binder of the diethyl phthalate. This film is not oily. It leaves no sticky residue, yet is thoroughly adequate to screen the skin from the light waves of burning or blistering wave lengths. Moreover, this composition is one that is itself stable to a considerable degree in sunlight. The screening compound is compatible with, or is soluble in, the diethyl phthalate in the presence of the alcohol despite the presence of water, though the compound itself is substantially insoluble in water.

Screen compounds herein disclosed, for example, benzalacetone oxalate, butyl ester, may be distributed upon a surface by an oily vehicle, if desired; for example, vegetable oils such as corn oil, peanut oil, or soya oil; or others which of themselves are known as vehicles for sun screen solutions may be used. It is particularly effective to distribute the sun screen with butyl mesityl oxide oxalate as a film forming binder. The proportions in this case also may be illustrated by the example given above in which alcohol and water are used as being compatible volatile diluents. The presence of the alcohol appears to effect a certain stabilization, tending to minimize hydrolysis.

In further comment on the example above given in which diethyl phthalate serves as a filming agent or in which butyl mesityl oxide oxalate serves likewise, it should be observed that the sun screening compounds described in this application are normally solids and so of themselves tend to result in a powdery material when applied to a surface. The nature of these filming agents is such as to dissolve sun screening solids and to form a solution that is compatible with the relatively large qauntities of alcohol and water distributants. Further, these solutions after the alcohol and water have evaporated nevertheless remains a pliable film. In the example given, benzyl acetone oxalate butyl ester is shown to form a solution of about 1.5% in the diethyl phthalate in the final film. Similar proportions apply to butyl metsityl oxide oxalate. A satisfactory range that is possible with these filming agents is about $\frac{1}{10}$ of 1% to about 10%, inasmuch as solubilities and resulting film properties are feasible within these limits. Moreover, these filming agents should possess suitable physiological qualities for application to skin.

In addition to actual sun exposure tests with all of the above mentioned compounds, I have had spectral transmission measurements made which demonstrate the unusually strong absorptive capacity of the fundamental molecular structure of this class of compounds for the burning rays of the sun. For example, alcoholic solutions of the esters of benzalacetone oxalate show substantial opacity up to 4600 Angstrom units at 0.5 per cent concentration. Furfural-acetone oxalic acid esters showing cut-off at ca. 4700 Angstrom units. For commercial practice I have found that the above compounds are particularly efficient at from 0.10 per cent to 5 per cent concentration. In the case of two or more used concurrently, the range of concentration of each may be lowered substantially.

Thus it will be evident that various substituents may be utilized in these substituted hexadienoic acid esters. However, it appears that the best results are obtained, particularly where solubility in oils is a factor, when as the $R_3$ substituent, which is the radical capable of combining with the carboxyl group, a desirable range of the number of carbon atoms in the substituent is from 3 to 7 and preferably from 4 to 6. It is within this range that the normal and secondary or various butyl esters fall; also the amyl esters.

This application is a continuation-in-part of my co-pending application Serial No. 158,001, filed August 7, 1937 and renewed December 11, 1939.

In accordance with the patent statutes, the principles of this invention have been illustrated by a preferred embodiment thereof, but it will now be apparent to those skilled in the art that modifications and alterations may be practiced within the scope of the appended claims.

What is claimed is:

1. An ester having the formula:

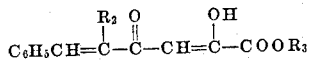

wherein $R_2$ equals H or an alkyl group and $R_3$ equals an aralkyl or alkyl group of 3 to 7 carbon atoms.

2. Light filtering composition capable of being applied as an intervening film between a light source and a surface to be protected, comprising an ester having the formula:

wherein $R_1$ may be a phenyl or substituted phenyl group, $R_2$ may be an alkyl group or hydrogen and $R_3$ may be an organic radical capable of forming an ester with the carboxyl group, distributed in a film forming binder.

3. Light filtering composition capable of being applied as an intervening film between a light source and a surface to be protected, comprising an ester having the formula:

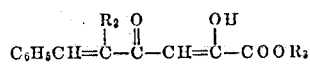

wherein $R_2$ equals H or an alkyl group and $R_3$ equals an aralkyl or alkyl group, dissolved in a film-forming binder and in a vehicle of a volatile diluent.

4. Light filtering composition capable of being applied as an intervening film between a light source and a surface to be protected, comprising an ester having the formula:

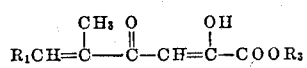

wherein $R_1$ may be a phenyl or substituted phenyl group and $R_3$ may be an alkyl or aralkyl group capable of forming an ester with the carboxyl group.

5. Light filtering composition capable of being applied as an intervening film between a light source and a surface to be protected, comprising a butyl ester having the formula:

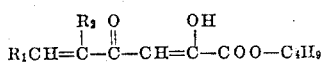

wherein $R_1$ may be a phenyl or substituted phenyl group, $R_2$ may be an alkyl group or hydrogen.

6. A light filtering composition capable of being applied as an intervening film between a light source and a surface to be protected comprising an ester of benzalacetone oxalate the ester group containing 3 to 7 carbon atoms distributed in a film forming vehicle.

7. As a new composition of matter benzalacetone oxalate, butyl ester dissolved in a solution of diethyl phthalate to a concentration of about 0.1 to 10% with respect to the diethyl phthalate.

8. As a new composition of matter benzalacetone oxalate, butyl ester dissolved in a solution of diethyl phthalate to a concentration of about .25 to 1.5% with respect to the diethyl phthalate.

9. A light filtering composition capable of being applied as an intervening film between a light source and a surface to be protected comprising benzalacetone oxalate, butyl ester, and a water soluble diluent.

10. A light filtering composition capable of being applied as an intervening film between a light source and a surface to be protected comprising a film-forming vehicle, and an ester of the formula:

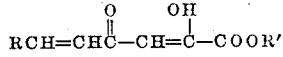

where R is of the group consisting of phenyl or substituted phenyl radical and of furane or substituted furane radical.

11. As a new composition of matter benzalacetone oxalate, butyl ester.

12. As a new composition of matter an ester of the group of butyl and amyl esters represented by $R_3$ in the general formula:

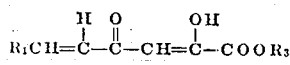

wherein $R_1$ may be a phenyl or substituted phenyl group.

13. As a new composition of matter 2, hydroxy benzalacetone oxalate, butyl ester.

14. As a new composition of matter furfuralacetone oxalate, butyl ester.

15. As a new composition of matter having light-filtering properties, an ester of benzalacetone oxalic acid, the ester group containing 3 to 7 carbon atoms.

16. A light-filtering composition capable of being applied as an intervening film between a light source and a surface to be protected comprising a film-forming vehicle, and an ester of the formula:

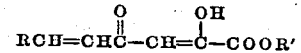

where R is of the group consisting of phenyl or substituted phenyl radical and of furane or substituted furane radical, the vehicle comprising mesityl oxide oxalate, butyl ester.

17. A light-filtering composition capable of being applied as an intervening film between a light source and a surface to be protected, comprising benzalacetone oxalate ester containing 3 to 7 carbon atoms in the ester group, a vehicle comprising mesityloxide oxalate ester containing 3 to 7 carbon atoms in the ester group, and a volatile common solvent comprising alcohol and water.

LOWELL B. KILGORE.